US010243971B2

(12) United States Patent
Campbell et al.

(10) Patent No.: US 10,243,971 B2
(45) Date of Patent: Mar. 26, 2019

(54) SYSTEM AND METHOD FOR RETROSPECTIVE NETWORK TRAFFIC ANALYSIS

(71) Applicant: Arbor Networks, Inc., Burlington, MA (US)

(72) Inventors: Aaron Campbell, Hammond Plains (CA); Christopher R. Hand, Sylvania, OH (US); Frank Murphy, Ann Arbor, MI (US)

(73) Assignee: Arbor Networks, Inc., Westford, MA (US)

(*) Notice: Subject to any disclaimer, the term of this patent is extended or adjusted under 35 U.S.C. 154(b) by 372 days.

(21) Appl. No.: 15/081,198

(22) Filed: Mar. 25, 2016

(65) Prior Publication Data
US 2017/0279817 A1  Sep. 28, 2017

(51) Int. Cl.
*H04L 29/06* (2006.01)
*H04L 12/26* (2006.01)

(52) U.S. Cl.
CPC ........ *H04L 63/1416* (2013.01); *H04L 43/022* (2013.01); *H04L 43/04* (2013.01); *H04L 43/062* (2013.01); *H04L 43/12* (2013.01); *H04L 63/1441* (2013.01)

(58) Field of Classification Search
None
See application file for complete search history.

(56) References Cited

U.S. PATENT DOCUMENTS

| H001944 H  | *  | 2/2001 | Cheswick ........................ 726/11 |
| 7,418,732 B2 | * | 8/2008 | Campbell ............. G06F 21/562 726/23 |
| 7,529,187 B1 | * | 5/2009 | Hernacki ............ H04L 63/1416 370/230 |
| 7,873,998 B1 | * | 1/2011 | Wilkinson ............ G06F 21/566 726/13 |
| 8,479,284 B1 | * | 7/2013 | Cooley ................... H04L 69/18 707/726 |
| 9,270,686 B1 | * | 2/2016 | Canion ............... H04L 63/1408 |
| 2004/0093513 A1 | * | 5/2004 | Cantrell .................. H04L 43/00 726/23 |

(Continued)

*Primary Examiner* — Michael R Vaughan
(74) *Attorney, Agent, or Firm* — Locke Lord LLP; Scott D. Wofsy; Christopher J. Capelli (57) ABSTRACT

A method is provided to monitor network traffic, including reserving a portion of a system memory for short-term storage of copied network traffic, wherein the system memory is volatile, receiving copied packets of intercepted network traffic traversing a network, wherein the packets are associated with a plurality of respective traffic streams included in the network traffic, storing the copied packets in the portion of the system memory, maintaining an ordered list per traffic stream of copied packets that are stored, removing copied packets selected, based on their positions in their respective ordered lists, from the portion of the system memory based on a storage constraint, receiving an attack alert identifying a packet that is involved in a network attack, identifying the traffic stream that includes the packet identified, and transferring stored copied packets that are included in the identified traffic stream from the portion of the system memory to a long-term storage device.

13 Claims, 4 Drawing Sheets

(56) References Cited

U.S. PATENT DOCUMENTS

| | | | | |
|---|---|---|---|---|
| 2006/0190594 A1* | 8/2006 | Jorgenson | ......... | H04L 29/06027 |
| | | | | 709/224 |
| 2008/0307093 A1* | 12/2008 | Song | ....................... | H04L 12/12 |
| | | | | 709/226 |
| 2010/0122317 A1* | 5/2010 | Yadav | ................. | H04L 63/1408 |
| | | | | 726/1 |
| 2012/0117640 A1* | 5/2012 | Ramsey | .............. | H04L 63/0218 |
| | | | | 726/11 |
| 2012/0222114 A1* | 8/2012 | Shanbhogue | ........... | G06F 21/53 |
| | | | | 726/22 |
| 2015/0156213 A1* | 6/2015 | Baker | ................. | H04L 63/1416 |
| | | | | 726/23 |
| 2016/0219065 A1* | 7/2016 | Dasgupta | ............ | H04L 63/1441 |
| 2017/0195462 A1* | 7/2017 | Kfir | ......................... | H04L 69/04 |
| 2017/0324709 A1* | 11/2017 | Ahn | .................... | H04L 63/0236 |

* cited by examiner

SYSTEM AND METHOD FOR RETROSPECTIVE NETWORK TRAFFIC ANALYSIS

FIELD OF THE INVENTION

The present echnology relates to data attack monitoring and, more particularly, methods and systems to retrospectively analyze, in realtime, packets included in a traffic stream associated with a detected attack.

BACKGROUND OF THE INVENTION

Passive or active monitoring devices can perform live network traffic inspection to detect a network attack. Offline analysis can be performed on packets determined to be involved in the attack that were captured and stored to long-term storage, such as to a disk. However, detection of the network attack may rely on detection of signatures and/or behaviors characteristic of attacks that may not be detected until a significant portion of a traffic stream including the determined packets has already been inspected.

Conventional methods and systems of monitoring traffic streams include capture and store to long-term storage all packets in the traffic streams being monitored in order to analyze the stored packets in the event that an attack is detected. Thus, packets included in traffic streams that are unrelated to an attack in addition to packets in traffic streams that are related to such attacks are stored in the long-term storage, requiring large quantities of long-term storage. The long-term storage used for capturing network traffic typically uses high-cost components that have the capability to operate quickly enough to keep-up with speed of the network traffic. In addition to high costs associated with the long-term storage, management of the large quantities of archived packets is complex and requires a high degree of overhead. Data retention time is limited due to the large quantities of data being stored. Additionally, slow data mining operations performed on the large amounts of stored data degrades user-experience.

Such conventional methods and systems have generally been considered satisfactory for their intended purpose. However, there is still a need in the art for reducing the amount of data stored for off-line analysis. The present disclosure provides a solution for these problems.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a network traffic monitoring system is disclosed. The network traffic monitoring system includes a processing device and system memory. The processing device is configured to reserve a portion of the system memory for short-term storage of copied network traffic, wherein the system memory is volatile, and receive copied packets of intercepted network traffic traversing a network, the packets being associated with a plurality of respective traffic streams included in the network traffic. The processing device is further configured to store the copied packets in the portion of the system memory, maintain an ordered list per traffic stream of copied packets that are stored, remove selected copied packets from the portion of the system memory based on a storage constraint, the copied packets being selected based on their positions in the respective ordered lists in which they are included, receive an attack alert identifying a packet that is involved in a network attack, identify the traffic stream that includes the packet identified, and transfer stored copied packets that are included in the identified traffic stream from the portion of the system memory to a long-term storage device.

In accordance with a further aspect a method of monitoring network traffic is disclosed. The method includes reserving a portion of the system memory for short-term storage of copied network traffic, the system memory being volatile, receiving copied packets of intercepted network traffic traversing a network, the packets being associated with a plurality of respective traffic streams included in the network traffic, storing the copied packets in the portion of the system memory, maintaining an ordered list per traffic stream of copied packets that are stored, removing selected copied packets from the portion of the system memory based on a storage constraint, the copied packets being selected based on their positions in the respective ordered lists in which they are included, receiving an attack alert identifying a packet that is involved in a network attack, identifying the traffic stream that includes the packet identified, and transferring stored copied packets that are included in the identified traffic stream from the portion of the system memory to a long-term storage device.

In accordance with a further aspect, a non-transitory computer readable storage medium and one or more computer programs embedded therein is disclosed. The computer programs include instructions, which when executed by a computer system, cause the computer system to reserve a portion of a system memory of the computer system for short-term storage of copied network traffic, the system memory being volatile, receive copied packets of intercepted network traffic traversing a network, the packets being associated with a plurality of respective traffic streams included in the network traffic, store the copied packets in the portion of the system memory, maintain an ordered list per traffic stream of copied packets that are stored, remove selected copied packets from the portion of the system memory based on a storage constraint, the copied packets being selected based on their positions in the respective ordered lists in which they are included, receive an attack alert identifying a packet that is involved in a network attack, identify the traffic stream that includes the packet identified, and transfer stored copied packets that are included in the identified traffic stream from the portion of the system memory to a long-term storage device.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
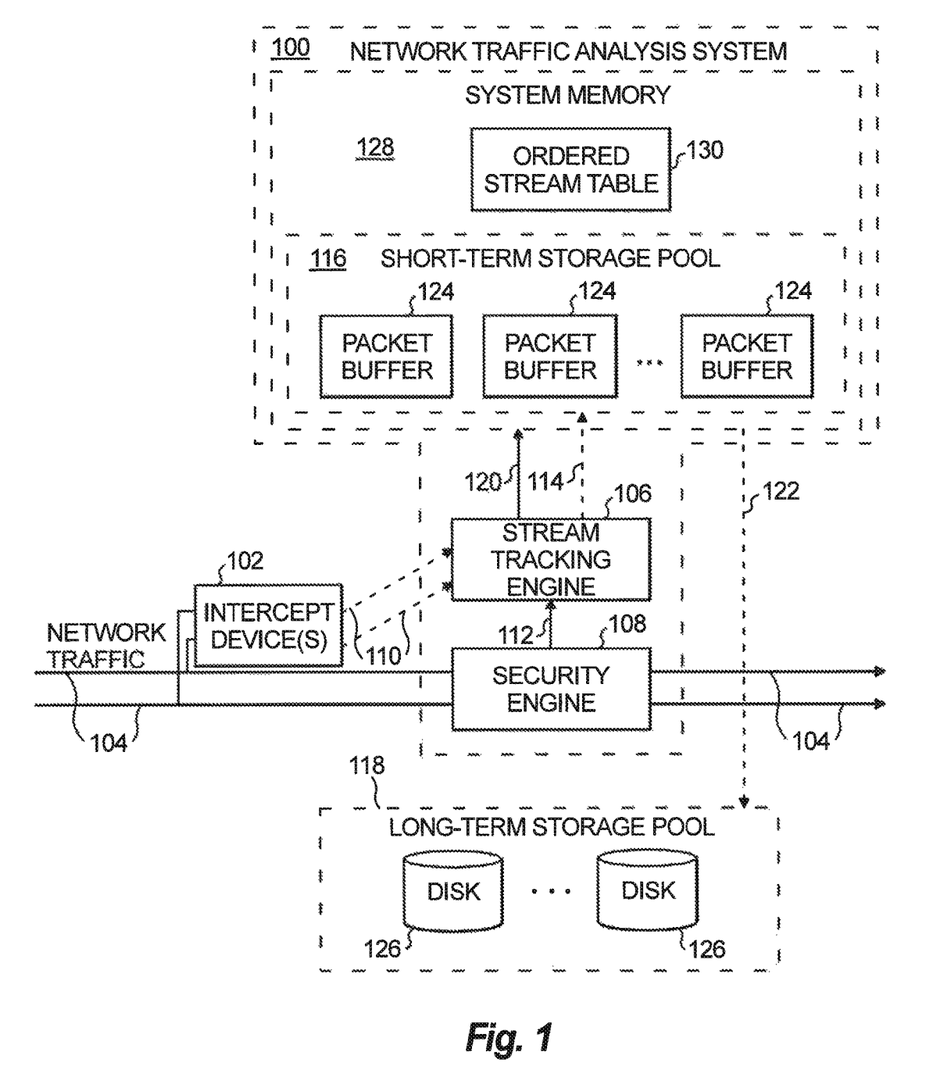
FIG. 1 illustrates a block diagram of an example network traffic analysis system in accordance with an illustrative embodiment of the present disclosure.

Reference will now be made to the drawings wherein like reference numerals identify similar structural features or aspects of the subject disclosure. For purposes of explanation and illustration, and not limitation, a block diagram of an exemplary embodiment of a network traffic analysis system in accordance with the disclosure is shown in FIG. 1 and is designated generally by reference character 100. Other embodiments of the network traffic analysis system 100 in accordance with the disclosure, or aspects thereof, are provided in FIGS. 2-4, as will be described. The systems and methods described herein can be used to provide improved network traffic analysis, for example in network monitoring applications.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, network traffic analysis system 100 receives actual network traffic associated with a network and copied network traffic. The actual network traffic is network traffic being transmitted from one or more source nodes (not shown) to respective destination nodes (not shown) that communicate with the network. The actual network traffic is captured by at least one intercept device 102. The term "capture," as used herein refers to intercepting and making a copy. The intercept device 102 intercepts and makes a copy of the actual network traffic as it propagates along communication links 104. The intercept devices 102 sends the copied packets to stream tracking engine 106 via one or more communication links 110 that are shown in dotted to lines to indicate that the data is copied. The actual network traffic passes through security engine 108 as it continues propagating through the network traffic analysis system 100.

In embodiments, the packets that exit the intercept devices(s) 102 are zero-copy packets, wherein the contents of the packets, upon initial reception at intercept device 102, are placed in the short-term storage pool 116, and are subsequently reference counted regarding distribution of the packet to both the security engine 108 and the stream tracking engine 106.

The stream tracking engine 106 tracks individual traffic streams of the copied network traffic based on a unique characteristic associated with the respective traffic streams. The unique characteristic can include for example, with regard to the standard OSI model of communications functions, the source and destination addresses at layer 3 (network layer) combined with source and destination ports at layer 4 (transport layer). Additionally, the stream tracking engine 106 maintains an ordered list of packets included in each traffic stream. The ordered list can be stored in a data structure, such as an ordered stream table 130 stored in the system memory 128. The stream tracking engine 106 can transmit the ordered list via communication link 120 to the system memory 128 for storage in the table 130. The order of the ordered list can be based on the age of the packets, e.g., using a time of arrival of the copied packet by the stream tracking engine 106 or a time that the copied packet was first stored in the short-term storage pool 116.

Furthermore, the stream tracking engine 106 stores the copied packets in a short-term storage pool 116 that is allocated for short-term storage of the copied packets. The copied packets are transmitted from the stream tracking engine 106 to the short-term storage pool 116 via communication link 114, shown as a dotted line to indicate that copied data is transmitted via the communication link. The amount of data saved in the short-term storage pool 116 can be limited based on a storage constraint.

For example, the storage constraint can include a maximum limit that limits the maximum number of copied packets that can be saved in the short-term storage pool 116 per traffic stream. When the maximum limit for a traffic stream is reached, a copied packet from that traffic stream can be removed from short-term storage provide room for each new incoming copied packet for that traffic stream. Removal of the packets can be based on the ordering of the list maintained so that the oldest packet is removed each time. In this way, packets stored in the short-term storage pool 116 are retained for as long as possible before they are removed. In another example, the storage constraint includes a timeout condition, in which the stream tracking engine 106 stops storing copied packets after the timeout condition occurs. For example, the stream tracking engine 106 may stop storing copied packets associated with a particular traffic stream once a predetermined time limit has been exceeded since the first copied packet associated with that traffic stream was stored in the short-term storage pool 116.

The security engine 108 performs active or passive security analysis on network packets of the network traffic in real time as the network traffic propagates through the network. The security analysis includes identifying packets that are involved in a network attack, such as eavesdropping, unwanted data modification, IP address spoofing, a password-based attack, a denial-of-service attack, a man-in-the-middle attack, a compromised-key attack, a sniffer attack, and an application-layer attack. Identification of an attack can include detecting particular signatures or behaviors associated with one or more packets that indicate an attack is underway or being setup. When an attack is identified, an attack alert is transmitted to the stream tracking engine 106 via communication link 112. The attack alert includes identification (ID) of one or more packets determined to be involved in the attack.

The stream tracking engine 106 can receive an attack alert from the security engine 108 notifying the stream tracking engine 106 that an attack has been detected. In response to the notification, the stream tracking engine 106 selects copied packets from the short-term storage pool 116 based on the packet IDs included in the attack alert that was received from the security engine 108.

In addition, in response to the attack alert, the stream tracking engine 106 further consults the ordered stream table 130 to identify a traffic stream to which the identified packet belongs. The stream tracking engine 106 determines copied packets that belong to the identified traffic stream that are currently stored in the short-term storage pool 116. The stream tracking engine 106 transfers the determined copied packets from the short-term storage pool 116 to the long-term storage pool 118 via communication link 122. Communication link 122 is shown as a dotted line to indicate that copied packets are transferred via communication link 122. The transfer includes removing these copied packets from the short-term storage pool 116.

In embodiments, the copied packets determined to be transferred from the short-term storage pool 116 to the long-term storage pool 118 include all of the copied packets that belong to the identified traffic stream that are currently stored in the short-term storage pool 116.

In other embodiments, the copied packets to be transferred are determined based on a transfer constraint so that only a portion of the copied packets that belong to the identified traffic stream that are currently stored in the short-term storage pool 116 are transferred. In an example without limitation thereto, the transfer constraint limits a number of copied packets that belong to the identified traffic stream that can be transferred from the short-term storage pool 116 to the long-term storage pool 118.

Accordingly, the copied packets that are transferred from the short-term storage pool 116 to the long-term storage pool 118 can include, for example, one or more copied packets in the identified traffic stream that were received by the traffic stream tracking engine 106 before the identified packet was received by the security engine 108, a copied packet that corresponds to the packet that was identified as being involved in the attack, and/or one or more copied packets in the identified traffic stream that were received by the stream tracking engine 106 after the packet that was identified as being involved in the attack was received by the security engine 108.

In embodiments, a source node that transmitted a packet that was determined by the security engine 108 to be involved in an attack can be labeled as a malicious source node. Traffic streams that are sent from the malicious source node can be stored in the long-term storage pool 118 regardless of whether a packet included in those traffic streams were determined by the security engine 108 to be involved in an attack.

The intercept devices 102 can include, for example, probes or taps that are configured to intercept and make copies of network traffic data. The intercept devices 102 can include hardware or firmware devices, and can include software modules, which can include software agents. Additionally, an intercept device can be a virtual intercept device that uses and/or shares hardware devices with other software modules, wherein the hardware devices can be positioned at locations remote from a location at which the intercept device operates.

The communication links 104, 110, 112, 114, 120, and 122 can include metal, wired, or wireless links, for example copper cables, copper traces, optical cables, near-field communication (NFC) links, and/or radio-frequency (RF).

The stream tracking engine 106 and the security engine 108 include one or more processing devices that execute software modules to perform the disclosed functions.

The short-term storage pool 116 includes short-term storage devices for temporary storage, such as volatile memory, e.g., RAM, DRAM, SRAM. The short-term storage pool 116 can be allocated from system memory 128 of the network traffic analysis system 100 for storing copied packets. The allocation can be performed during initialization of the network traffic analysis system 100 and/or during operation of the network traffic analysis system 100. In embodiments, the short-term storage pool 116 includes a plurality of packet buffers 124 that consumes a relatively large portion of the system memory 128. In embodiments, the short-term storage pool 116 can consume a majority of the system memory 128. The short-term storage pool 116 may consume the entirety of system memory 128, excluding the portion of system memory 128 required by the remainder of the system components to function, or a portion thereof. The buffers 124 can be physically noncontiguous. Additionally, a buffer 124 can include noncontiguous system memory.

The long-term storage pool 118 includes one or more long-term storage devices 126 for long-term storage. For example, the long-term storage devices 126 can be nonvolatile memory, such as a magnetic disk, flash memory, hard drive, or solid state drive.

Figure 2:
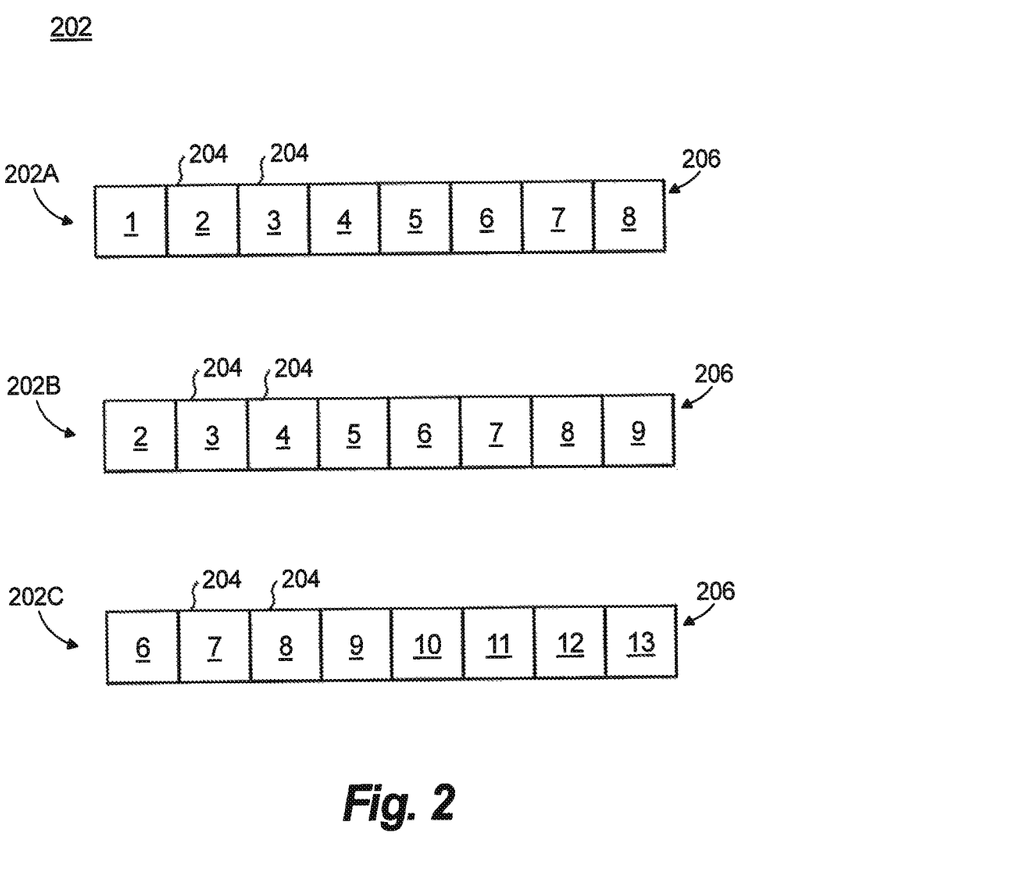
FIG. 2 illustrates a schematic diagram of multiple instances of content stored in a packet buffer of the network traffic analysis system shown in FIG. 1 in accordance with an illustrative embodiment of the present disclosure.

FIG. 2 shows different instances 202 of content stored in one of the packet buffers 124, wherein the content includes copied packets 204 associated with a traffic stream buffer 206. In the example shown, a constraint is applied that limits the amount of copied packets 204 that can be stored for a traffic stream buffer 206 to N. In the current example for illustration purposes only, N=8. In a first instance 202A at time t1, the first eight copied packets 204 (labeled 1-8) of the traffic stream buffer 206 are stored in the short-term storage pool 116. In a second instance 202B at time t2, a different set of eight copied packets 204 (labeled 2-9) of the traffic stream buffer 206 are stored in the short-term storage pool 116 after a new packet (labeled 9) was received and the longest stored packet 124 (labeled 1) was discarded due to the constraint. In a third instance 202C at time t3, a different set of eight copied packets 204 (labeled 6-13) of the traffic stream buffer 206 are stored in the short-term storage pool 116. Due to the constraint, the four new packets had been received (labeled 10-13) and the four longest stored packets 204 (2-5) were discarded. Accordingly, the constraint causes the packet buffer 124 to store a fixed length window of packets included in the traffic stream, wherein the window is updated as copied packets are received.

Figure 3:
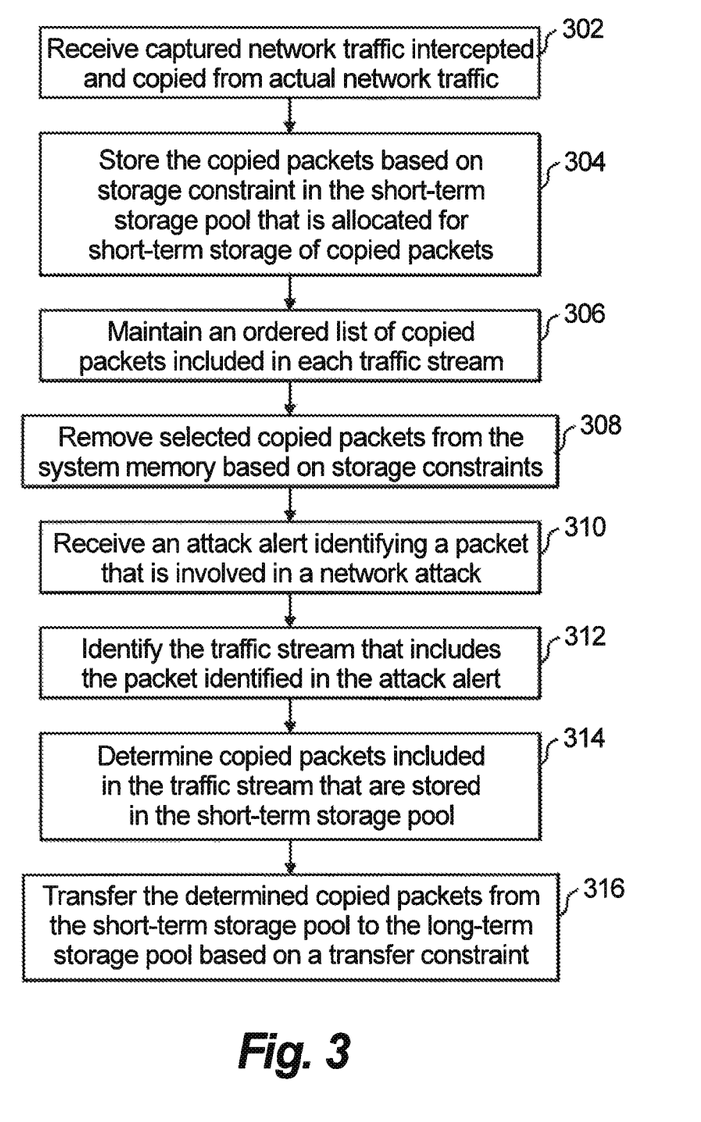
FIG. 3 illustrates a flowchart illustrating a method of operation of the network traffic analysis system shown in FIG. 1 in accordance with an illustrative embodiment of the present disclosure.

With reference now to FIG. 3, shown is a flowchart demonstrating implementation of the various exemplary embodiments. It is noted that the order of operations shown in FIG. 3 is not required, so in principle, the various operations may be performed out of the illustrated order. Also certain operations may be skipped, different operations may be added or substituted, or selected operations or groups of operations may be performed in a separate application following the embodiments described herein.

At operation 302 captured network traffic is received that was intercepted and copied from actual network traffic. At operation 304, the copied packets are stored. The storage can be based on a storage constraint (if a storage constraint is being applied), in the short-term storage pool 116 that is allocated for short-term storage of copied packets. At operation 306, an ordered list is maintained of copied packets included in each traffic stream. At operation 308, selected copied packets are removed from the portion of the system memory based on storage constraints. The copied packets are selected based on their positions in the respective ordered lists in which they are included. At operation 310, an attack alert is received that identifies a packet that is involved in a network attack. At operation 312, the traffic stream that includes the packet identified in the attack alert is determined.

At operation 314, copied packets are determined that are included in the traffic stream and that are stored in the short-term storage pool. At operation 316, the determined copied packets are transferred from the short-term storage pool to the long-term storage pool. The transfer can be based on a transfer constraint.

Accordingly, as additional packets are captured and storage capacity is reached for a traffic stream due to the storage constraints, storage space needs to be provided for the newly captured packets. The ordered list is used to determine which packets are to be removed to make space for the newly captured packets. The ordered list can indicate the order in which the packets were captured and stored. Packets that have been stored for the longest period of time will be removed from the short-term storage pool 116 and replaced by newly captured packets. In this way, packets are stored for as long as possible until storage constraints require that they be removed. Thus, when copied packets of a traffic stream are transferred from the short-term storage pool 116 to the long-term storage pool 118, the transferred packets include the most recently captured packets and previously captured packets based on the storage capacity for storing the traffic stream as defined by the storage constraints.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the network traffic analysis system 100 may be implemented or executed by one or more computer systems. For example, network traffic analysis system 100 can be implemented using a computer system such as example computer system 402 illustrated in FIG. 4. In various embodiments, computer system 402 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Figure 4:
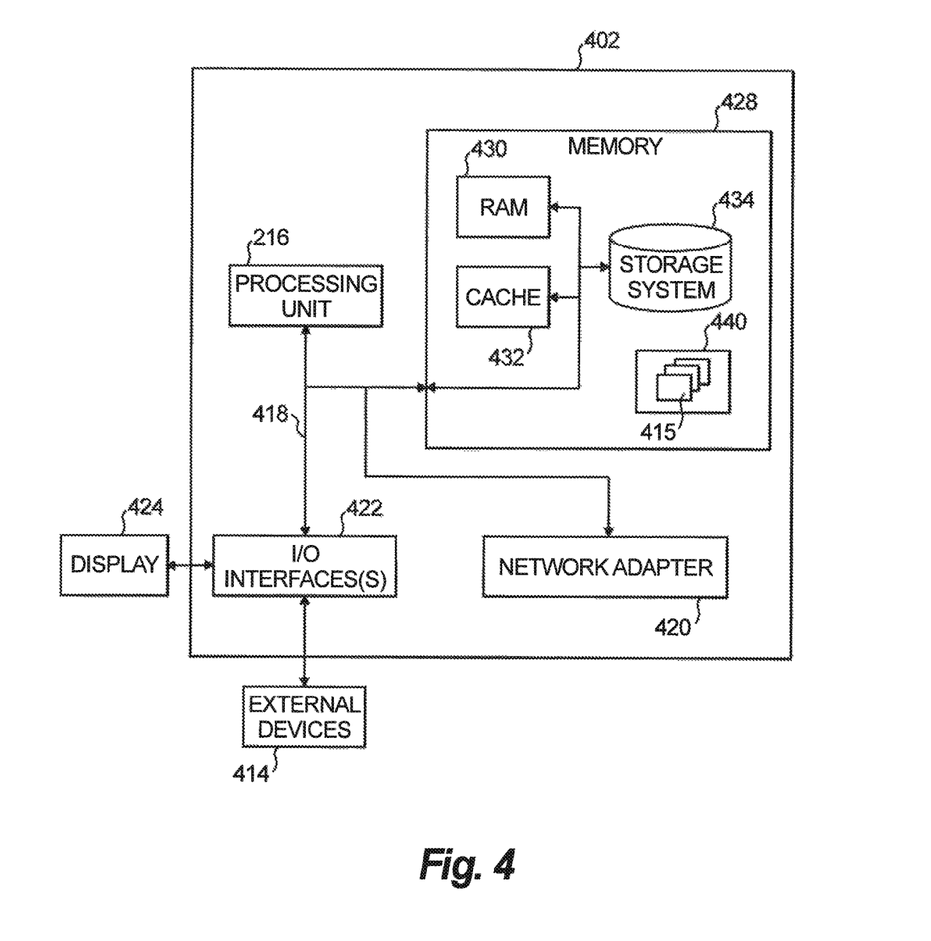
FIG. 4 illustrates internal and external components of a computing system that implements the network traffic analysis system of FIG. 1 in accordance with an illustrative embodiment of the present disclosure.

Computer system 402 is only one example of a suitable system and is not intended to suggest any limitation as to the scope of use or functionality of embodiments of the disclosure described herein. Regardless, computer system 402 is capable of being implemented and/or performing any of the functionality set forth hereinabove.

Computer system 402 may be described in the general context of computer system-executable instructions, such as program modules, being executed by a computer system. Generally, program modules may include routines, programs, objects, components, logic, data structures, and so on that perform particular tasks or implement particular abstract data types. Computer system 402 may be practiced in distributed data processing environments where tasks are performed by remote processing devices that are linked through a communications network. In a distributed data processing environment, program modules may be located in both local and remote computer system storage media including memory storage devices.

Computer system 402 is shown in FIG. 4 in the form of a general-purpose computing device. The components of computer system 402 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 402 typically includes a variety of computer system readable media. Such media may be any available media that is accessible by network management server 104, and it includes both volatile and non-volatile media, removable and non-removable media.

System memory 428 can include computer system readable media in the form of volatile memory, such as random access memory (RAM) 430 and/or cache memory 432. Computer system 402 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the disclosure.

Program/utility 440, having a set (at least one) of program modules 415, such as computer system 402, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 415 generally carry out the functions and/or methodologies of embodiments of the disclosure as described herein.

Computer system 402 may also communicate with one or more external devices 414 such as a keyboard, a pointing device, a display 424, etc.; one or more devices that enable a user to interact with computer system 402; and/or any devices (e.g., network card, modem, etc.) that enable network management server 104 to communicate with one or more other computing devices. Such communication can occur via Input/Output (I/O) interfaces 422. Still yet, computer system 402 can communicate with one or more networks such as a local area network (LAN), a general wide area network (WAN), and/or a public network (e.g., the Internet) via network adapter 420. As depicted, network adapter 420 communicates with the other components of network management server 104 via bus 418. It should be understood that although not shown, other hardware and/or software components could be used in conjunction with computer system 402. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the network traffic analysis system 100 include minimizing an amount of network data that is stored in long term storage for analysis related to detected attacks. The network data stored in long term storage is limited to copies of data packets that have been determined to be included in traffic streams having at least one packet associated with a detected attack.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A network traffic monitoring system comprising:
a processing device;
a traffic intercept device configured to intercept and copy network traffic traversing a network;
a stream tracking device coupled to the traffic intercept device configured to receive the copied packets from the intercept network traffic device wherein the copied packets are associated with a plurality of respective traffic streams included in the network traffic;
a security device coupled to the stream tracking device configured to detect attacks in the network traffic traversing on the network;
a first memory storage for storing the copied packets of the intercepted network traffic for a first time period;
a second memory storage for storing at least a portion of the copied packets in the first memory for a second time period wherein the second time period is greater than the first time period; and
a processing device configured to:
store the copied packets in the first memory;
maintain an ordered list per traffic stream of copied packets that are stored in the first memory;
remove selected copied packets from first memory based on a storage constraint, the copied packets being selected based on their positions in the respective ordered lists in which they are included;
receive an attack alert from the security device identifying a packet that is involved in a network attack;
identify the traffic stream stored in the first memory storage that includes the packet identified; and
transfer stored copied packets that are included in the identified traffic stream from the first memory storage to the second memory storage wherein transferring the copied packets from the first memory storage includes removing the transferred copied packets from the first memory storage.

2. The network traffic monitoring system of claim 1, wherein the ordered list for each traffic stream is ordered based on when the copied packets included in the list were stored in the portion of the system memory.

3. The network traffic monitoring system of claim 2, wherein the storage constraint specifies at least one of a maximum number of copied packets allowed to be stored per traffic stream, a maximum amount of memory space in the system memory allowed to be used to store copied packets per traffic stream, and a maximum amount of time allowed to store a copied data packet.

4. The network traffic monitoring system of claim 1, wherein at least a portion of the copied packets transferred to the long-term storage device were stored in the portion of the system memory before a copy of the identified packet was stored in the portion of the system memory.

5. The network traffic monitoring system of claim 1, wherein the captured packets are captured at a zero-copy stage.

6. The network traffic monitoring system of claim 1, wherein the copied packets transferred to the long-term storage device are removed from the portion of the system memory.

7. The network traffic monitoring system of claim 1, wherein the portion of the system memory for short-term storage of copied network traffic is a majority of the system memory.

8. A method of monitoring a network comprising:
reserving a first portion of system memory for short-term storage of copied network traffic, the system memory being volatile;
reserving a second portion of the system memory for long-term storage of copied network traffic moved from the first portion of the system memory;
receiving copied packets of intercepted network traffic traversing a network, the packets being associated with a plurality of respective traffic streams included in the network traffic;
storing the copied packets in the first portion of the system memory;
maintaining an ordered list per traffic stream of copied packets that are stored;
removing selected copied packets from the first portion of the system memory based on a storage constraint, the copied packets being selected based on their positions in the respective ordered lists in which they are included;
receiving an attack alert identifying a packet that is involved in a network attack;
identifying the traffic stream that includes the packet identified; and
transferring stored copied packets that are included in the identified traffic stream from the first portion of the system memory to the second portion of the system memory wherein transferring the copied packets to the second portion of the system memory includes removing the transferred copied packets from the first portion of the system memory.

9. The method of claim 8, wherein the ordered list for each traffic stream is ordered based on when the copied packets included in the list were stored in the first portion of the system memory.

10. The method of claim 8, wherein the storage constraint specifies at least one of a maximum number of copied packets allowed to be stored per traffic stream, a maximum amount of memory space in the system memory allowed to be used to store copied packets per traffic stream, and a maximum amount of time allowed to store a copied data packet.

11. The method of claim 8, wherein the captured packets are captured at a zero-copy stage.

12. The method of claim 8, wherein the first portion of the system memory is a majority of the system memory.

13. A non-transitory computer readable storage medium and one or more computer programs embedded therein, the computer programs comprising instructions, which when executed by a computer system, cause the computer system to:
reserve a first portion of a system memory of the computer system for short-term storage of copied network traffic, the system memory being volatile;
reserve a second portion of the system memory for long-term storage of copied network traffic moved from the first portion of the system memory;
receive copied packets of intercepted network traffic traversing a network, the packets being associated with a plurality of respective traffic streams included in the network traffic;
store the copied packets in the portion of the system memory;
maintain an ordered list per traffic stream of copied packets that are stored;
remove selected copied packets from the portion of the system memory based on a storage constraint, the copied packets being selected based on their positions in the respective ordered lists in which they are included;
receive an attack alert identifying a packet that is involved in a network attack;
identify the traffic stream that includes the packet identified; and
transfer stored copied packets that are included in the identified traffic stream from the first portion of the system memory to the second portion of the system memory wherein transferring the copied packets the second portion of the system memory includes removing the transferred copied packets from the first portion of the system memory.

* * * * *